> United States Patent Office 3,732,186
Patented May 8, 1973

3,732,186
POLYISOCYANATES CONTAINING CYCLIC
IMIDE GROUPS
Willi Dunwald, Leverkusen-Alkenrath, Karl-Heinz Mielke, Cologne-Stammheim, Gerhard Muller, Leverkusen, and Rudolf Merten, Cologne-Flittard, Germany, assignors to Bayer Aktiengesellschaft, Leverkusen, Germany
No Drawing. Continuation of application Ser. No. 688,619, Dec. 6, 1967, which is a continuation of application Ser. No. 326,606, Nov. 26, 1963, both now abandoned. This application Aug. 5, 1971, Ser. No. 169,461
Claims priority, application Germany, Jan. 8, 1963, F 38,722
Int. Cl. C08g 22/00
U.S. Cl. 260—77.5 AM        13 Claims

ABSTRACT OF THE DISCLOSURE

A polyisocyanate composition containing at least two free —NCO groups and at least one cyclic imide group in the molecule and having a molecular weight of from about 200 to about 10,000 are prepared by reacting, in an inert organic solvent, aliphatic and aromatic anhydrides with organic polyisocyanates. The polyisocyanates of the invention are particularly useful as precursors in the preparation of lacquers and coatings.

---

This application is a continuation of application Ser. No. 688,619, filed Dec. 6, 1967, now abandoned, which is a continuation of application Ser. No. 326,606 filed Nov. 26, 1963, now abandoned.

This invention relates to polyisocyanates and more specifically to novel polyisocyanates containing imide groups.

Lacquers which have been obtained by the polyaddition reaction between high molecular weight compounds containing hydroxyl groups and polyisocyanates and which have good flexibility, surface hardness and chemical resistance are known. In addition, they have good electrical properties and insulating properties, and for this reason, they have been in use for a long time for covering electric conductors made of copper. One disadvantage of these lacquer coatings is that they cannot stand up to sudden heat treatment at high temperatures once they have been stretched, for example, by winding a lacquered wire over a mandrel having approximately the same diameter as the copper wire. When such a so-called curled wire is placed in a heating oven at temperatures above 160° C., tears and cracks are produced in the lacquer film after a relatively short time. There has been no lack of attempts in the past to overcome this difficulty. For example, certain improvements have been achieved by mixing the lacquer with other lacquer raw materials, and a slightly higher resistance to heat shock treatment has been obtained by careful selection of the hydroxyl components, but this has been off-set by other disadvantages such as low resistance to solvents and moisture and to scraping, so that no completely satisfactory solution has been found.

It is, therefore, an object of this invention to provide novel polyisocyanates devoid of the above-noted disadvantages. Another object of this invention is to provide polyisocyanates adapted for use in the preparation of lacquers and other polyurethane materials. Still another object of this invention is to provide a polyisocyanate which may be used to provide lacquers having good mechanical and electrical properties. A still further object of this invention is to provide novel polyisocyanates which may be used to produce lacquers which have a high resistance to cracking when exposed to elevated temperatures. Another object of this invention is to provide novel polyisocyanates which may be easily and economically produced. Still a further object of this invention is to provide novel polyisocyanates which may be easily produced and are adapted to be readily produced in presently existing production systems.

The foregoing objects and others which are accomplished in acordance with this invention, generally speaking, are provided by a polyisocyanate composition having at least two free isocyanate groups and at least one cyclic imide structure

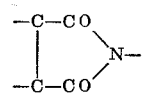

in the molecule and a molecular weight between about 200 and 10,000.

With the lacquer mixtures according to the invention, it is now possible to overcome all the disadvantages mentioned above so that highly elastic film coatings of very good mechanical and electrical properties and excellent resistance to heat shocks are obtained when lacquer mixtures of the kind described below are used for covering wires.

The lacquer mixtures according to the invention contain polyisocyanates or masked polyisocyanates with at least one cyclic acid imide group.

Polyisocyanates with at least one cyclic acid imide group and with a molecular weight of 200–10,000, are obtainable, for example, from the reaction products of polyamines, e.g. ethylene diamines, tetramethylene diamine, hexamethylene diamine, m- and p-phenylene diamine, 2,4- and 2,6-toluylene diamine, diphenylmethane diamine, triphenylmethane triamine, 1,4-diaminocyclohexane or 4,4'-diaminodicyclohexyl methane with the carboxylic acids described below which contain at least one cyclic anhydride group and at least one further hydrogen atom capable of reacting with —NCO groups. The reaction products are treated with the polyisocyanates given below which are used in excess with respect to the reactive hydrogen atoms still left in the reaction products. Amino alcohols, e.g. ethanol amino of β-(aminophenyl)-ethanol or aminocarboxylic acids such as aminobenzoic acid or aminonaphthalene carboxylic acid may be used instead of the polyamines.

The polyisocyanates with at least one cyclic acid imide group contained in the lacquer mixtures according to the invention may be reaction products of polyisocyanates and compounds which contain in the molecule at least two groups which are reactive to isocyanates. At least one of these groups must have a cyclic anhydride configuration. This anhydride structure reacts with an —NCO group, splitting off $CO_2$ to form a cyclic imide according to the general equation scheme

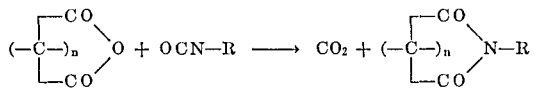

according to which the anhydride configuration reacts with a functionality of one. This reaction scheme can be made use of in the preparation of the polyisocyanate compositions of the invention. To this end, compounds with either two or more cyclic anhydride configurations or at least one cyclic anhydride configuration and additional reactive hydrogen atoms are reacted with an excess of polyisocyanate. These reactive hydrogen atoms may occur, for example, in the hydroxyl-, mercapto- and carboxylic- or amino groups.

It is particularly advantageous to use tri-basic carboxylic acids or carboxylic acids of higher basicity, in which at least two carboxyl groups are present as cyclic anhydrides. Anhydrides in this sense may be derived, for example, from pyromellitic acid, trimellitic acid, mellitic acid, naphthalene-1,4,5,8-, naphthalene-2,3,6,7- or naphthalene-1,2,5,6-tetracarboxylic acids, diphenyl-3,3',4,4'- and diphenyl-2,2',3,3'-tetracarboxylic acid, 2,2-di-(3,4-dicarboxyphenyl)-propane, di-(3,4-dicarboxyphenyl)-sulphone, perylene-3,4,9,10-tetracarboxylic acid or ethylene tetracarboxylic acid. In addition, there may be mentioned hydroxy-, mercapto- or amino-o-phthalic acid, hydroxy-, mercapto- or amino-naphthalene dicarboxylic acids in which the carboxyl groups are in the ortho position to one another, all of these being used after conversion of at least two carboxyl groups into the cyclic anhydride. Diadducts of maleic acid or maleic anhydride to styrene or substituted styrene are also suitable.

Typical polyisocyanates that may be used in accordance with the invention include aliphatic diisocyanates such as butane-, hexane- and heptane diisocyanate, aliphatic diisocyanates with built-in ring systems such as ω,ω'-diisocyanate-1,3-dimethyl benzene, ω,ω'-diisocyanate - 1,4 - dimethlycyclohexane, ω,ω'-diisocyanate-1,4-diethyl benzene and cyclohexane-1,3-, cyclohexane-1,4-, 1-methyl-cyclohexane-2,4-, dicyclohexylmethane-4,4'-diisocyanates. Mention may be made in addition of mixed aromatic-aliphatic and aromatic-hydroaromatic diisocyanates such as 4-phenylisocyanate - methylisocyanate, tetrahydronaphthylene-1,5-, hexahydrobenzidine-4,4'- and hexahydrodiphenylmethane-4,4'-diisocyanate, and diisocyanates of benzene and its homologues, for example, 1,3-phenylene-, 1,4-phenylene-, 1-methylbenzene-2,4- and 1-methylbenzene-2,6-diisocyanate and their isomeric mixtures, mono- di- and triisopropylbenzyl-diisocyanates, polyisocyanates of naphthalene, of diphenyl, of di- and triphenylmethane, of polynuclear ring systems or of polyphenyl compounds. Examples of the last mentioned classes are naphthalene-1,4-, naphthalene-1,5-, diphenyl-4,4'-, diphenylmethane-4,4'- anthraquinone-2,6- and diphenylsulphide-2,4-diisocyanate, triphenylmethane-4,4',4''-triisocyanate, 4,4'-dimethyl-diphenylmethane-2,2',5,5'-tetraisocyanate, 4,4',4''-triisocyanate phosphoric acid triphenyl ester and polyphenylmethyl polyisocyanates such as obtained by the condensation of aniline and formaldehyde followed by phosgenation. The isocyanates used in accordance with the invention may also be substituted by halogen, alkoxy, azo, nitro, cyano, ester or sulphonic acid groups. Examples of such isocyanates are 1-chlorobenzene-, 1-nitrobenzene- and 1-methoxybenzene-2,4-diisocyanate, azobenzene-4,4'-diisocyanate and benzidine sulphonic-4,4'-diisocyanate.

The proportions between the compound with the anhydride configuration and the polyisocyanate may be varied widely provided the polyisocyanate is used in excess with respect to the functional groups in order to produce free isocyanate groups and a molecular weight of the product of from about 200 to 10,000. In general, 0.6 to 2, preferably 0.7 to 1.5 mol of polyisocyanate will be used per functional group.

The isocyanate groups of the polyisocyanate produced which contain acid imide groups may be masked in known manner with compounds which may be split off again, for example, with phenol, substituted phenols or compounds which contain active methylene groups.

Polyisocyanates of any desired isocyanate content, i.e., any degree of condensation may be produced, depending on the proportions of the starting components, the reaction time and the reaction temperature. The high molecular polyisocyanates obtained by the process described above may be isolated in known manner as free or as masked isocyanates either in pure form or in solution, for example, by crystallization, precipitation or sublimation. Polyisocyanate compositions of specific interest are the reaction products of 1 mol of trimellitic acid anhydride with more than 1 mol of hexamethylene diisocyanate, toluylene diisocyanate and 4,4'-diphenyl methane diisocyanate and mixtures thereof, furthermore the reaction product of 1 mol of pyromellitic acid anhydride with more than 1 mol of hexamethylene diisocyanate, toluylene diisocyanate and 4,4'-diphenylmethane diisocyanate and mixtures thereof.

The polyisocyanates containing acid imide groups thus represent compounds which can be reacted in known mananer with substances containing reactive hydrogen atoms in the molecule.

These high molecular weight polyisocyanates with acid imide groups are also capable of self cross-linking reaction; since, by virtue of their structure, they already contain a sufficient number of reactive hydrogen atoms in the molecule.

The lacquer mixtures according to the invention, generally, contain suitable solvents or mixtures, and it has been found in practice that a certain proportion of non-solvents may also be added. As solvents there may be used, for example, phenols, esters, ketones, ethers, substituted amides, sulphoxides and sulphones such as phenol, cresol, acetophenone, methyl glycol acetate, ethyl glycol acetate or higher glycol ether acetates or propionates, N-methylpyrrolidone, dimethylformamide, dimethylacetamide, dimethylsulphoxide, dimethylsulphones, or mixtures of these compounds. The solids content of these solutions may vary within limits and will depend both on the type of components and on their solubility as well as the purpose for which the lacquer mixtures according to the invention are intended. Solvents having a solids content of about 15 to 40% may, in general, be considered for use.

The lacquer mixtures are particularly suitable for use as stoving lacquers, the stoving being carried out at elevated temperatures and the curing time depending on the curing temperature employed in each case. For example, about 20 minutes are required when an oven temperature of about 180° C. is employed. For shorter stoving times it is necessary to use higher temperatures, and longer times are required for lower temperatures.

The lacquer films so obtained have remarkable properties such as exceptional hardness, good elasticity and good resistance to solvents. The electrical properties such as dielectric strength and insulation are excellent. In addition, the stoved lacquer films have good resistance to temperature and ageing, which is shown by the fact that the important properties such as elasticity and di-electric strength are substantially maintained even after extreme temperature changes or prolonged storing at high temperatures. This material is, therefore, particularly suitable for insulating electric conductors made of copper.

A copper wire is passed several times through a bath of the said lacquer solution in a lacquering oven of the type generally used for this purpose, and each time it is stoved in a continuous flow furnace. For an oven length of 4 meters and an oven temperature of about 350 to 370° C., the speed at which a copper wire, for example, of a thickness of about 0.7 mm. is passed through is 6 to 8 meters per minute.

The lacquered wires produced by this method may, for example, be wound round a mandrel of the same diameter as the copper conductor and will withstand a subsequent heat shock treatment of about 250° C. for one hour. The method for carrying out this test is described in the relevant DIN regulations, particularly in DIN 46453. In a comparison test carried out on an ordinary commercial lacquered wire based on terephthalic acid polyester of the type nowadays recommended for the construction of electrical machinery of the heat class F (155° C.), the maximum resistance to heat shock treatment is at about 160° C. The pencil hardness (measured according to DIN 46453) is also higher in the new material. The abrasion resistance is markedly improved.

Another important property of a lacquer wire is the resistance of the lacquer film to mechanical stress in a water bath. To test this, a lacquered wire is bent under water round a stepped mandrel having several cylindrical steps each 10 mm. wide, the diameters decreasing from step to step from about 100 to 10 mm. The water bath contains about 0.5% sodium chloride to render it conductive. The water bath and the copper wire are connected to a direct current at a test voltage of 100 v. If tears or cracks are produced in the lacquer film when the wire is bent in the water bath, a glow lamp lights up because contact is then established. Most of the usual lacquer wires cannot be bent around a mandrel of 10 mm. under these conditions whereas a copper wire covered with a lacquer film of the new material will invariably stand up to this test.

The good properties of the lacquer coatings obtained with the lacquer mixtures according to the invention are substantially maintained even when other components containing reactive hydrogen atoms such as polyesters, polyester amides or polyamides, which are all known per se, are added to the lacquer mixtures, although perhaps the heat resistance is then not quite so high. Terephthalic acid polyesters have been found to be particularly suitable. These can be obtained in known manner from terephthalic acid and dihydric or polyhydric alcohols such as glycols and glycerol and/or trimethylolpropane and other polyhydric alcohols.

The proportions in which the polyisocyanates containing acid imide groups are mixed with compounds containing reactive hydrogen atoms in the lacquer mixture according to the invention, generally, lie in the range of from about 1 to 1, i.e. the components are used in equivalent quantities. Deviations from this may be due to the nature of the polyesters or of the polyisocyanate with the acid imide groups so that in some cases it may be advisable to use a higher proportion of polyesters and in other cases a higher proportion of isocyanate compound.

Other lacquer raw materials may also be contained in the lacquer mixtures according to the invention although the proportions of the resulting lacquer film depend to a certain extent on the nature of the components used in the mixture. However, an improvement in the mechanical and electrical properties will always be obtained. Suitable components that may be added to the mixture are found to be, for example, epoxy resins, polyurethane (prepared from polyesters containing —OH groups and polyisocyanates) and polyamides. Here again they may be added in stoichiometric quantities, although considerably less or considerably more may be used. The elastic properties of the lacquer film may then undergo changes but the resistance to thermal shock invariably remains good.

The subsequent cross-linking action is particularly promoted by the addition of catalysts to the lacquer mixture, i.e. the reaction time is shortened and a lower stoving temperature may be employed.

Such catalysts include organic compounds of titanium, lead, copper, iron or alkaline earth metals, for example, monomeric or polymeric titanium butylate, lead naphthenate or lead octoate, zinc naphthenate or zinc octoate, copper semi-porphyrazine, ferric acetonyl acetone, calcium naphthenate, dibutyl tin dilaurate and other catalysts. Amine- and ammonium compounds may also be used, particularly, quaternary salts, for example, tetramethyl ammonium acetate, tetramethyl ammonium terephthalate and chlorine octoate.

These catalysts are used in quantities of 0.1 to 3% calculated on the solids content of the lacquer. Although higher quantities are not deleterious they do not bring any marked advantages.

It remains to be mentioned that the good elastic properties of the lacquer films obtained from the lacquer mixtures according to the invention makes these mixtures suitable for use as coatings for metal sheets which are subjected, after the lacquering process to a forming process such as deep drawing. When subjected to the Erichsen test, these lacquered deep drawn metal sheets have cupping values above about 7 mm. at which the metal sheet is itself usually destroyed.

The invention will be further described with reference to the following examples which are meant to illustrate and not limit the invention. Parts and percentages are by weight unless otherwise indicated.

EXAMPLE 1

A solution of about 110 parts of diphenylmethane-4,4'-diisocyanate and about 52.5 parts of hexamethylene-1,6-diisocyanate in about 250 parts of N-methyl-pyrrolidone is added dropwise at about 50 to 60° C. to a solution of about 96 parts of trimellitic acid anhydride in about 250 parts of N-methylpyrrolidone. The reaction mixture is heated to about 120° C. for about four hours while stirring under nitrogen. The isocyanate content of the solution is then 1.35%. The polyisocyanate so produced is masked by reacting it with about 25 parts of crude cresol. About 718 parts of a solution of the masked polyisocyanate in N-methylpyrrolidone are obtained (viscosity, 2070 $cp._{25}$; solids content 33%).

This solution can be used directly for covering copper conductors. The copper wire is conducted vertically from below, upwards through a bath containing the lacquer solution and is thus provided with a coating of liquid lacquer. The excess is stripped off by means of metal stripping nozzles which are generally provided above the lacquer bath for this purpose. The coating wire is then passed through a stoving oven in which the solvent is evaporated by heat and the lacquer is cured. This process is repeated several times until the coating has the necessary thickness. About six to eight passages are generally required.

The length of the oven is 4 meters, the oven temperature about 350° C. and the speed at which the wire travels is about 5 to 7 meters per minute. The thickness of the copper wire is 0.7 mm. By lacquering the wire six times, the diameter increases by about 60$\mu$, i.e. the lacquer film has a thickness of about 30$\mu$.

When the lacquer wire is treated for its resistance to scraping (NEMA or DIN 46453) it is found to resist about 140 double strokes.

Its stability when wound round a mandrel of 0.7 mm. diameter is excellent even when the wire has previously been stretched by 20% of its original length. This represents a stretching of the outermost layer by 80%.

When the wire is wound round a mandrel of diameter 0.7 mm. and this so-called winding curl is placed in a heating oven heated to a temperature of about 260° C. to subject it to a heat shock treatment for about 60 minutes, no tears or breaks whatsoever can be detected in the lacquer film when a lens magnifying about 10 times (DIN 46453). The softening temperature measured according to DIN 46453, is in the region of about 270 to 280° C.

The breakdown voltage measured on twisted samples of wire (DIN 46453) is found to be 7.5 to 8.5 kv.

The hardness of the lacquer film is 6H (DIN 46453) and after treatment in alcohol at about 50° C. for about 30 minutes, it is still found to be 6H.

The wire can be bent under water round a mandrel having a diameter of about 10 mm. without any tears being produced. This is concluded from the observation that when a direct voltage of about 100 volts is applied to the copper wire and to the water bath, the control lamp connected between them is not lit up because there is no contact.

EXAMPLE 2

A mixture of about 384 parts dimethyl terephthalate, about 93 parts glycol and about 46 parts glycerol to which about 0.5 part litharge is added as catalyst is slowly heated with stirring. The mixture is at first heated to about 120 to about 130° C. Ester interchange takes place and the methanol splits off and is removed by distillation. The mixture is then heated to about 200 to 225° C. with stirring, the reaction being then completed within 3 to 4 hours. A dark molten resin remains behind, which solidifies to a hard mass when poured onto a sheet.

About 100 parts of the terephthalic acid polyester so obtained are dissolved in a mixture of about 100 parts cresol and about 10 parts N-methyl pyrrolidone with stirring and simultaneously heating to about 80 to 100° C. and after cooling the solution is thoroughly mixed with about 300 parts of the solution of polyisocyanates containing acid imide groups prepared according to Example 1.

A copper wire of 0.7 mm. thickness is lacquered with this lacquer mixture as in Example 1. A dark colored lacquer coating is obtained.

The properties are substantially the same as those of the lacquer wire produced according to Example 1. There is excellent resistance to tight curling and to heat shock treatment and good di-electric strength even after ageing at about 200° C. The resistance to scraping, measured by the NEMA method, corresponds to about 100 double strokes. The softening temperature lies in the region of about 280 to 300° C. and the resistance to bending under water is also excellent. This wire can be bent under water round a mandrel having a diameter less than 10 mm. without any tears occurring in the lacquer film. The film hardness is 4H and this value is maintained even after the wire has been stored in alcohol for about 30 minutes at about 50° C.

This wire is particularly suitable for winding motors, transformers and electrical machines which are subjected to high temperature stresses.

EXAMPLE 3

A mixture of about 65 parts of 2,4-toluylene diisocyanate and about 63 parts of hexamethylene-1,6-diisocyanate is added dropwise at about 40° C. in the course of 10 to 15 minutes to a solution of about 96 parts of trimellitic acid anhydride in about 500 parts of N-methyl pyrrolidone. After heating the reaction mixture for about 6½ hours at about 120° C., the isocyanate content is 1.5%. The polyisocyanate produced by this method is masked by treating it with about 30 parts of crude cresol. About 705 parts of a solution of the masked polyisocyanate in N-methyl pyrrolidone (viscosity 144 cp.$_{25}$; solids content 34%) are obtained. About 90 parts of the terephthalic acid polyester prepared according to Example 2 are dissolved in a mixture of about 105 parts cresol and about 105 parts N-methyl pyrrolidone, the mixture being heated and stirred. After cooling to room temperature, about 265 parts of the above-described solution of polyisocyanate containing acid imide groups are added.

The lacquer mixture is used for lacquering a copper wire of 0.7 mm. thickness as in Example 1. A dark colored lacquer coating is obtained. Tests carried out on this lacquer wire also give excellent results.

The winding strength and the response to heat shock treatment are excellent. The resistance of scraping is about 50 to 60 double strokes (tested according to NEMA). Softening takes place at temperatures between about 270 and 290° C. and the test for breakdown voltage gives values of 7 to 8 kv. The pencil hardness is 4H and after keeping the wire in alcohol at about 50° C. for about 30 minutes, it is found to be 2 to 3H. The resistance to ageing is good, i.e. the above values are substantially preserved even after allowing the wire to stand in a heating cupboard for about 100 hours at about 180° C.

EXAMPLE 4

A solution of about 100 parts of the terephthalic acid polyester described in Example 2 dissolved in about 200 parts of a solvent mixture of cresol and N-methyl pyrrolidone in the proportion 1 to 1 is added to about 450 parts of the masked polyisocyanate solution containing acid imide groups, prepared according to Example 1. A cooled solution of about 1.5 parts titanium butylate in about 200 parts cresol previously heated to about 120° C. for about 10 minutes is added to this mixture.

Copper wires of diameter 0.7 mm. are lacquered with this lacquer mixture as described in Example 1. The draw-off speed of the wire can be increased by 1 meter per minute because of the addition of titanium butylate. A dark colored lacquer film having excellent properties is obtained on the wire. In addition to good winding strength and good resistance to heat shock treatment at about 260° C. the resistance to scraping corresponds to about 80 to 100 double strokes. The di-electric strength is in the region of 8 to 9 kv. The pencil hardness, even after the usual storage in alcohol, is 4H. The softening temperature lies in the region of about 290 to 320° C. The flexural strength under water measured by the test described above is also excellent.

EXAMPLE 5

About 50 parts of an epoxy resin (prepared from 4,4'-dihydroxydiphenyl - dimethyl - methane and epichlorohydrin, epoxy equivalent about 200) are dissolved in a mixture of about 50 parts cresol and about 50 parts dimethylsulphoxide with stirring. About 750 parts of the 33% solution in N-methyl pyrrolidone of the masked polyisocyanate containing acid imide groups, prepared according to Example 1 are then added and the components are thoroughly mixed by stirring.

A lacquered wire produced with this lacquer mixture also has good winding strength and good resistance to heat shock treatment. The other properties are also excellent. The softening temperature is found to be about 300° C. and the hardness of the lacquer film is 6H which is maintained after storing in alcohol.

If a deep drawn metal sheet coated with this lacquer is stoved for about 30 minutes at about 200° C., a lacquer film is obtained which easily withstands cupping of 7 mm. when tested with the Erichsen instrument.

EXAMPLE 6

A solution of about 281 parts of diphenyl methane-4,4'-diisocyanate and about 195 parts of 2,4-toluylene and 2,6-toluylene diisocyante (isomeric mixture) in about 750 parts of N-methyl pyrrolidone is added dropwise at about 50 to 60° C. to a solution of about 288 parts of trimellitic acid anhydride in about 750 parts of N-methyl pyrrolidone. The reaction mixture is heated at about 120° C. for about 1½ hours. The isocyanate content of the solution is then 1.44%. The polyisocyanate formed is masked by treating it with about 90 parts of crude cresol. About 2205 parts of a solution of the masked polyisocyanate in N-methyl pyrrolidone are obtained (viscosity 425 cp.$_{25}$; solids content 33%).

A second solution of about 200 parts of a polyester of 2 mols of o-phthalic acid anhydride, 2 mols of trimethylolpropane and about 1 mol of ethylene glycol in about 200 parts cresol and about 200 parts methyl glycol acetate is added to about 300 parts of this solution.

A deep drawn metal sheet coated with this lacquer mixture and stoved for about 20 minutes at about 180° C. has a lacquer film of excellent elasticity and adherance. The Erichsen test gives cupping values of about 7 mm. in which the metal sheet itself is usually destroyed.

EXAMPLE 7

A solution of about 250 parts of diphenylmethane-4,4'-diisocyanate in about 500 parts of dimethyl formamide is slowly added dropwise at about 25° C. to a solution of about 109 parts of pyromellitic acid anhydride in about 500 parts of dimethylsulphoxide. The reaction mixture is slowly heated to about 100° C. in the course of about 20 to 30 minutes, the mixture being stirred at the same time. About 100 parts of phenol are then added and the mixture is stirred and heated for another about 15 minutes at about 100 to 110° C. A solution of a polyisocyanate masked with phenol and containing acid imide groups is obtained. About 50 parts of a second solution consisting of about 20 parts of the terephthalic acid polyester described in Example 2, and about 30 parts of cresol is added to about 500 parts of this solution.

A copper wire of 0.5 mm. thickness is lacquered with this mixture and again a dark colored lacquer coating is obtained which has the known good properties as regards elasticity, softening temperature, resistance to scraping, hardness and di-electric strength. The resistance to water and to ageing are also excellent.

A deep drawn metal sheet coated with this lacquer and stoved for about 15 minutes at about 220° C. can be strongly deformed and stretched without the lacquer splitting off or tearing.

EXAMPLE 8

A solution of about 168 parts of hexamethylene-1,6-diisocyanate in about 300 parts of N-methyl pyrrolidone is added dropwise at about 25° C. to a solution of about 96 parts of trimellitic acid anhydride in about 400 parts of N-methyl pyrrolidone. The reaction mixture is heated to about 100° C. for about two hours. About 100 parts of phenol are then added and the mixture is heated for another 30 minutes at about 110° C. and stirred at the same time, and the resulting solution of polyisocyanate masked with phenol and containing acid imide groups is left to cool. Analysis shows that the product contains about 5.6% of —NCO capable of being split off.

About 760 parts of terephthalic acid-di-glycol ester, about 210 parts of benzene-1,2,4-tricarboxylic acid and about 1 part of lead oxide are then heated slowly to about 200° C. in the course of about one hour while nitrogen is passed through, water being distilled off vigorously in the process. As soon as the liberation of water slows down, the reaction temperature is raised to about 220 to 225° C. and the reaction mixture is then left for another four hours at this temperature. About 53 parts of distillate are obtained. After another ½ hour in a vacuum of about 200 mm., the reaction product is poured onto a dry metal sheet to cool it. The brittle pale yellow resin has an —OH content of 5.5% and an acid number of 4.5.

About 100 parts of this resin are dissolved in about 300 parts of a mixture consisting of equal parts of cresol and N-methyl pyrrolidone and combined with about 300 parts of the solution, obtained as described above, of masked polyisocyanate containing acid imide groups.

Copper wires are lacquered with this lacquer mixture in the manner described. These wires have good winding strength, excellent resistance to heat shock treatment and good abrasion resistance. The electrical properties are also good and show only a slight decline after prolonged ageing at about 200° C.

EXAMPLE 9

A solution of about 384 parts of hexahydro-diphenyl-dimethyl-4,4'-diisocyanate in 700 parts of methyl formamide is added dropwise at about 50 to 60° C. to a solution of about 192 parts of trimellitic acid anhydride in about 700 parts of N-methyl pyrrolidone. The reaction product is heated for about three hours at about 100° C. About 100 parts by weight of phenol are added and the mixture is heated for another 30 minutes at about 110° C. and stirred at the same time.

The resulting masked polyisocyanate which contains acid imide groups is shown by analysis to contain 3.5% of —NCO capable of being split off.

About 400 parts of this solution are combined with about 300 parts of a solution consisting of about 200 parts of a solvent mixture of equal parts of cresol and N-methyl pyrrolidone and about 100 parts of a polyester containing 5.3% —OH and formed from about 2 mols adipic acid, about 3 mols maleic acid anhydride, about 4 mols butylene glycol and about 2 mols trimethylolpropane. A copper wire coated with this lacquer mixture has a dark color and excellent elasticity and electric insulating properties.

Deep drawn metal sheets covered with such a lacquer can be stretched to an extraordinarily great extent without any tears or breaks occurring in the lacquer film.

It is to be understood that this invention is not limited by the examples, but that any of the compositions mentioned above as typical for use in the present invention may be used in place of those set forth in the examples with similar results.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A polyisocyanate composition having at least two free —NCO groups and at least one cyclic imide group in the molecule and having a molecular weight of from about 200 to about 10,000, said polyisocyanate composition having been obtained from the reaction of an anhydride selected from the group consisting of aliphatic and aromatic anhydrides, said anhydride having at least two groups reactive with isocyanates, at least one of said groups having a cyclic anhydride configuration, with an organic polyisocyanate in an inert organic solvent wherein at least a portion of said solvent is selected from the group consisting of N-methyl pyrrolidone, dimethylformamide, dimethylacetamide, a sulfoxide and a sulfone.

2. The polyisocyanate composition of claim 1 wherein one mol of trimellitic acid anhydride is reacted with an excess of one mol of a member selected from the group consisting of hexamethylene diisocyanate, tolylene diisocyanate and 4,4'-diphenyl methane diisocyanate.

3. The polyisocyanate composition of claim 2 wherein pyromellitic acid anhydride is substituted for trimellitic acid anhydride.

4. The polyisocyanate composition of claim 1 wherein the —NCO groups are blocked with phenols.

5. The polyisocyanate composition of claim 2 wherein the —NCO groups are blocked with phenols.

6. The polyisocyanate composition of claim 3 wherein the —NCO groups are blocked with phenols.

7. A lacquer composition comprising a solvent and the polyisocyanate composition of claim 1.

8. A lacquer composition comprising a solvent and the polyisocyanate composition of claim 4.

9. A lacquer composition comprising the polyisocyanate composition of claim 4, a solvent and compounds containing at least two groups capable of reacting with the —NCO groups and selected from the group consisting of polyesters, polyamides and epoxy resins.

10. A metal substrate coated on at least one surface with the polymer obtained by curing the polyisocyanate of claim 1 on a substrate.

11. The lacquer composition of claim 9 wherein said compound containing groups capable of reacting with the —NCO groups are phenylene dicarboxylic acid polyesters.

12. The lacquer composition of claim 9 containing a polyamide.

13. The lacquer composition of claim 9 containing an epoxy resin.

References Cited

UNITED STATES PATENTS

| | | | |
|---|---|---|---|
| 3,012,984 | 12/1961 | Hudson | 260—31.2 |
| 3,022,200 | 2/1962 | Koerner et al. | 117—218 |
| 3,179,633 | 1/1962 | Endrey | 260—78 |
| 3,300,420 | 1/1961 | Frey | 260—2.5 |

OTHER REFERENCES

Saunders et al. Polyurethanes, Part II, Interscience, New York, 1964, pp. 453, 454, 463, 464, 485, 488–490 and 601–607.

Bayer, Angew. Chem., A59, 1947, pp. 260 and 265.

DONALD E. CZAJA, Primary Examiner

M. J. WELSH, Assistant Examiner

U.S. Cl. X.R.

117—128.4, 132 A, 132 BF, 132 C; 260—30.2, 30.8 R, 30.8 DS, 31.4 R, 32.6 N, 32.8 N, 33.4 UR, 47 CB, 77.5 R, 77.5 TB, 78 TF, 858